May 29, 1951 P. JUILLET 2,554,532
STEREOSCOPY
Filed July 11, 1946 4 Sheets-Sheet 1

INVENTOR:
Pierre Juillet
By Alexander Dowell
ATTORNEYS

May 29, 1951 P. JUILLET 2,554,532
STEREOSCOPY
Filed July 11, 1946 4 Sheets-Sheet 2
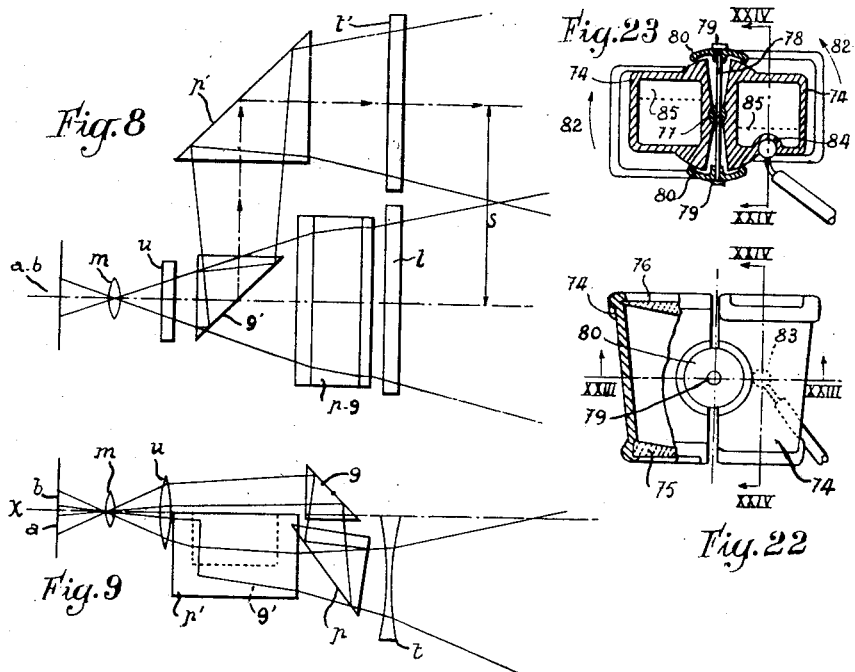
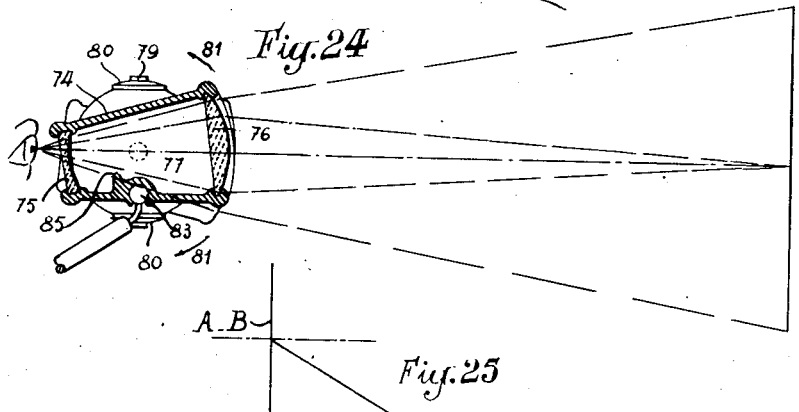
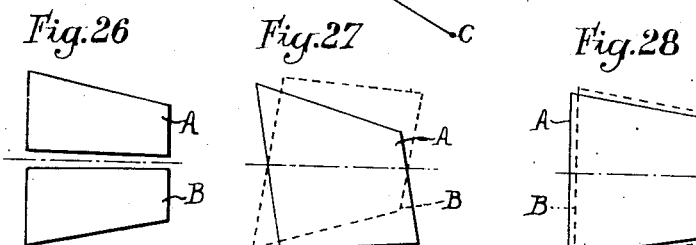
INVENTOR:
Pierre Juillet
By Harness Dell
ATTORNEYS May 29, 1951  P. JUILLET  2,554,532
STEREOSCOPY
Filed July 11, 1946  4 Sheets-Sheet 3

INVENTOR:
Pierre Juillet
By [signature]
ATTORNEYS

May 29, 1951    P. JUILLET    2,554,532
STEREOSCOPY
Filed July 11, 1946    4 Sheets-Sheet 4

Pierre Juillet INVENTOR
By Alexander Dowell
ATTORNEYS

Patented May 29, 1951

2,554,532

UNITED STATES PATENT OFFICE 2,554,532

STEREOSCOPY

Pierre Juillet, Albon (Drome), France, assignor to Relief-Lyon-France, Lyon, France, a French joint-stock company Application July 11, 1946, Serial No. 682,748
In France November 20, 1942

Section 1, Public Law 690, August 8, 1946
Patent expires November 20, 1962

9 Claims. (Cl. 88—16.6)

My invention relates to stereoscopic methods wherein the elementary images are of relatively large dimensions, for instance, are formed on a projection screen, as in the case of stereoscopic cinematograph.

In conventional stereoscopy the elementary images are exactly disposed before the observer's eyes. These images are seen in exactly the same manner and they are easily combined by the observer. But with images of large dimensions, the distance between the axes of the two elementary two images is much greater than the distance between the eyes of the observer and the two images are not seen under the same angle. Their deformation due to perspective is different and their optical combination becomes difficult, painful or sometimes quite impossible. This difference between the two stereoscopic images is particularly marked for the spectators situated laterally of the screen who fail in practice to perceive any stereoscopic effect with the known methods.

Another drawback of stereoscopy with images of large dimensions is that it requires abnormally large screens if it is desired to retain for the stereoscopic image the same size as for the usual flat image.

The known stereoscopic methods also require special photographic apparatus with two lenses or objectives. In stereoscopic cinematography it has also been proposed to use a single film wherein each pair of successive images correspond to a stereoscopic couple.

A first object of my invention is to provide a method wherein during the photographic or cinematographic recording the axes of the objectives corresponding to each elementary image are angularly displaced with respect to one another in such a manner that the said images are subjected, owing to the difference of perspective under which they have been taken, to deformations opposed and substantially equal to those which will result from the difference of perspective under which they will be viewed by the observer.

A further object of my invention is to record both elementary images with the same objective by disposing in front thereof two systems of mirrors or prisms which lead to the same under two equal and opposed inclinations, the light rays received from the subject at two points spaced from each other by the stereoscopic spacing selected.

Still another object of my invention is a method wherein the images are recorded with a linear deformation of the kind known under the name of anamorphose, in such a manner that they are reduced in dimensions in the direction of their juxtaposition on the film or like support, the said images being observed through an anamorphosing device complementary to the device used for their recording. In the case of projected images, the surface of the screen is thus fully used and the deformation resulting from perspective is reduced.

The device for observing the projected images preferably comprises two monocular elements adjustable with respect to each other by rotation about an axis substantially longitudinal with respect to each in such manner that it should be possible to deform the virtual images until they are substantially identical.

My invention also relates to an optical device intended to be disposed in front of an usual photographic or cinematographic camera to carry my invention into practice, such device comprising two sets of reflecting prisms, symmetrical with respect to the longitudinal axis of the objective and at such an angle in a plane transverse to the said axis, that a bundle of rays supposedly coming from the objective should be divided into two semi-bundles emerging at the same horizontal level, means being provided to maintain the optical axes of the said semi-bundles in one and the same plane.

My improved optical device also comprises an auxiliary set of reflecting prisms with slightly oblique reflecting faces, disposed between the objective and the main set of prisms, this auxiliary set being adapted for rotation about a longitudinal axis, whereby the stereoscopic angle under which a subject is seen at a given distance may be varied at will.

Figure 3:
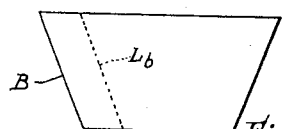

Fig. 3 diagrammatically shows in elevation how the elementary images may be recorded with two objectives.

Figure 4:
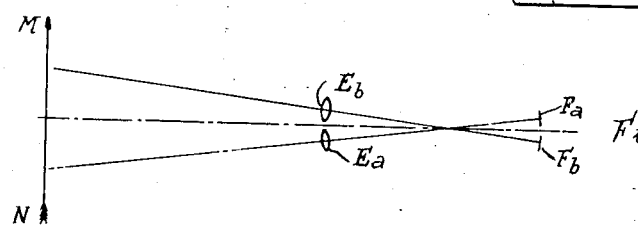

Fig. 4 shows how these images may be recorded by means of only one objective.

Figure 5:
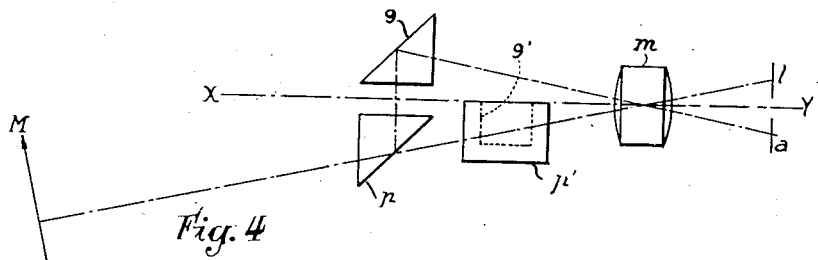

Fig. 5 is a plan view corresponding to Fig. 4.

Figure 6:
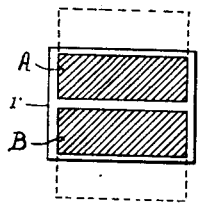
Figure 7:
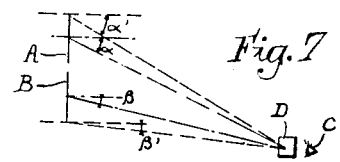

Figs. 6 and 7 are elevation and plan views diagrammatically showing how perspective deformation may be reduced by anamorphosing the images on the screen.

Figs. 8 and 9 diagrammatically illustrate an arrangement similar to that of Figs. 3 and 4, but comprising a double anamorphosing system.

Figure 10:
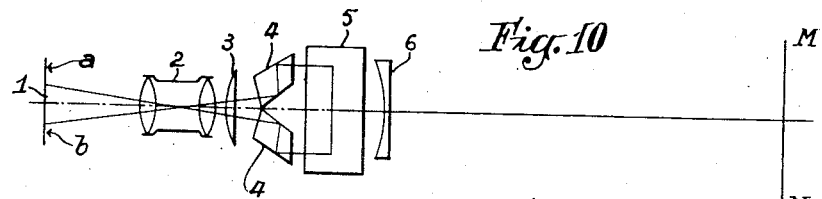
Figure 11:
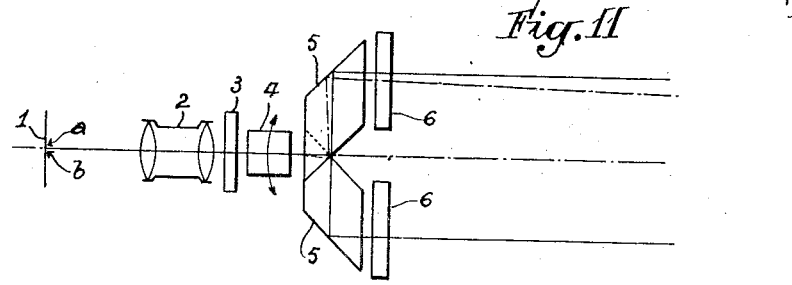
Figure 12:
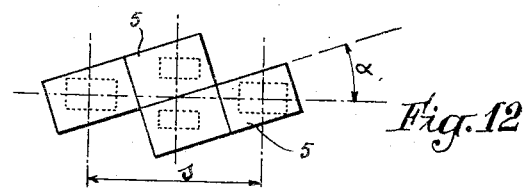

Figs. 10 to 12 diagrammatically show in side view, plan view and end view an optical system to be adapted in front of a camera with but one objective in order to record two stereoscopic images.

Figure 13:
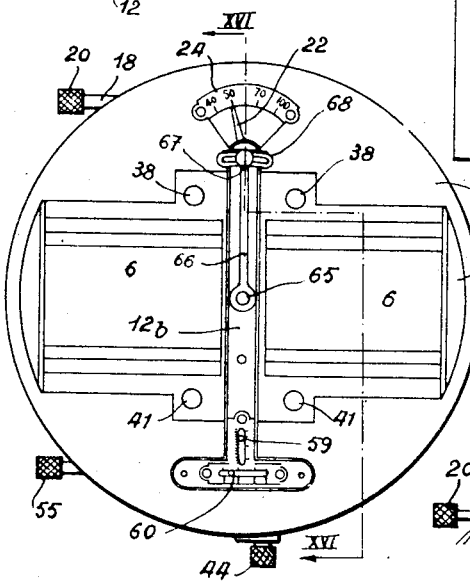

Fig. 13 is a front view of this optical system.

Figure 14:
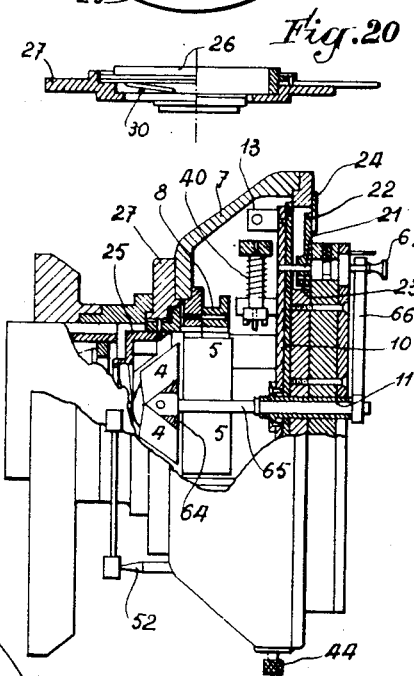

Fig. 14 is a side view thereof with parts in section.

Figures 15, 16:
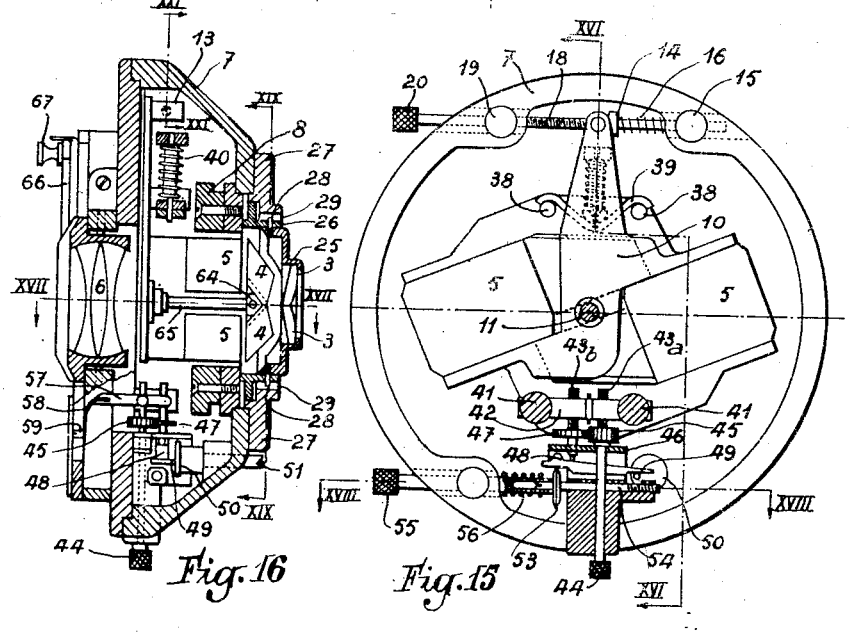

Fig. 15 is a front view, the cover with its lenses being supposedly removed, and some parts being shown in section.

Fig. 16 is a longitudinal section through line XVI—XVI of Fig. 15.

Figure 17:
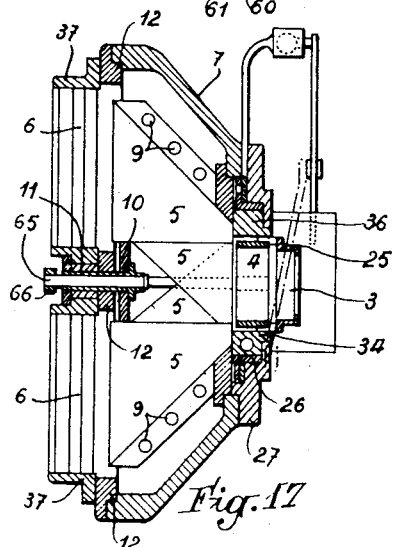

Fig. 17 is a section through line XVII—XVII of Fig. 16.

Figure 18:
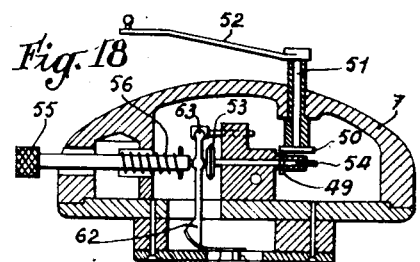

Fig. 18 is a section through line XVIII—XVIII of Fig. 15.

Figure 19:
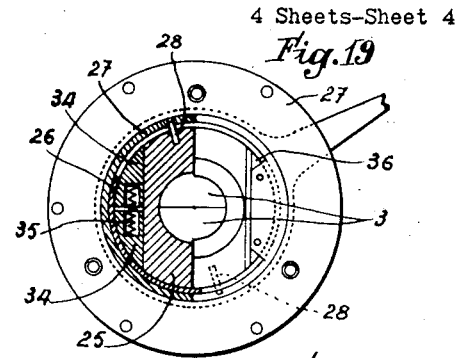

Fig. 19 is an end view of the support of the cylindrical converging lens, with partial section through line XIX—XIX of Fig. 16.

Figure 20:
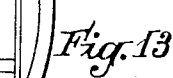

Fig. 20 is a longitudinal section of the rotatable ring of this support.

Figure 21:

Fig. 21 is a section through line XXI—XXI of Fig. 16.

Fig. 22 is a plan view with parts in section, illustrating an observing device for the elementary stereoscopic images projected on a screen.

Fig. 23 is a section thereof through line XXIII—XXIII of Fig. 22.

Fig. 24 is a section through line XXIV—XXIV of Figs. 22 and 23, illustrating the path of the light rays.

Fig. 25 is a diagrammatical plan view illustrating the position of an observer laterally disposed with respect to the screen.

Figs. 26 to 28 are explanatory diagrams showing how the images are deformed by perspective for this observer and how the device of Figs. 22 to 24 enables this deformation to be corrected.

Figure 1:
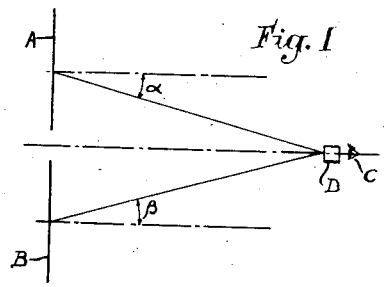
Fig. 1 is a diagrammatical elevation illustrating the phenomena which take place during observation of elementary stereoscopic images of large dimensions on a screen.
Figure 2:
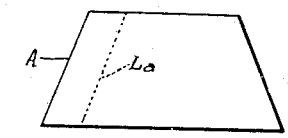
Fig. 2 shows the screen as it appears to the observer.

In Figs. 1 and 2, A and B are two elementary stereoscopic images juxtaposed in height, for instance on a projection screen. These images are observed by an observer C through an apparatus D which enables him to see respectively one image with the right eye and the other image with the left eye. The images are thus superimposed and the observer perceives but one image in relief. But these elementary images are viewed under two angles $\alpha$ and $\beta$ which are algebraically different from each other (in the particular case of Fig. 1 they are opposed). It follows that they are not viewed with the same deformation due to perspective. In the case of Fig. 1 they will appear as two inverted trapezes, as indicated in Fig. 2. A vertical line will appear as two lines $La$ and $Lb$ with opposed obliquity. It will easily be understood that the superposition of images A and B will be difficult and will cause fatigue for the observer's eyes.

In order to avoid this drawback, the objectives $Ea$ and $Eb$ (Fig. 3) used for taking the elementary images of the subject MN are inclined in opposed direction, the first one being inclined towards the lower part of subject MN while the other is inclined towards the upper part thereof. The elementary images recorded on the photographic surfaces $Fa$ and $Fb$ are thus deformed by perspective, their respective deformations being opposed. If, for instance, MN is a rectangle, the two elementary images obtained will have the form of trapezes and these trapezes will be in inverted respective relation. The images A and B projected on the screen will thus be deformed in opposed relation with respect to the deformation resulting from their observation by observer C and it will be understood that the two deformations may compensate each other.

Of course, in the case of a hall perfect compensation can only be obtained for a given position of the observer, for instance for the central part of the hall. But for the other parts the residual deformation is relatively small and the above-described drawback is considerably reduced.

It will also be understood that the vertical extension of the elementary images obtained on surfaces $Fa$ and $Fb$ is not the same and that it is necessary to suppress the upper portion of one image and the lower portion of the other to have two corresponding stereoscopic images.

In lieu of two separate objectives $Ea$ and $Eb$, there could be used but one objective, as illustrated in Figs. 4 and 5. The light rays from the subject are led to this objective $m$ through two sets of prisms which displace their paths horizontally and vertically. A first set of two prisms $p$ and $q$ receives the rays from MN in a direction inclined upwardly with respect to the objective axis XY. These rays are first reflected vertically and then in a direction inclined downwardly with respect to axis XY, in such a manner that they form the lower elementary image $a$ behind the objective $m$. A second set $p'$ and $q'$ also receives rays from MN in an upwardly oblique direction, but at a horizontal distance $s$ from axis XY, $s$ being equal to the desired stereoscopic spacing. They are reflected horizontally and are thus brought into the vertical plane of axis XY where they are again reflected in an upwardly oblique direction to form the upper elementary image $b$. Images $a$ and $b$ are deformed in opposed relation by perspective.

For a better understanding of the phenomena involved, it is better to consider the reverse direction of the light rays, i. e. to suppose that MN is the projection of images $a$ and $b$. It will be understood that if the latter correspond to two different stereoscopic points of view in accordance with the stereoscopic spacing $s$, their combined projection may form a single image MN. It will also be understood that owing to the inclination of the mean axis of the rays from each image $a$ or $b$ towards the objective $m$ with respect to axis XY, the said images $a$ and $b$ should be deformed in opposed respective relation to enable the correct superimposition of their projections.

When the elementary images are projected on a screen, they occupy a considerable surface. This requires an abnormally large screen, often difficult to dispose in a given hall, and moreover these elementary images of large dimensions are viewed by a given observer under two materially different angles, which causes a difference of perspective liable to render difficult or tiresome the correct perception of relief.

According to my invention this is remedied by reducing by one half the height of the images without modifying their width, by the so-called anamorphosing process. Fig. 6 illustrates a screen $r$ on which the projected images A and B have been anamorphosed in height. They may thus be disposed within a screen of normal dimensions whereas, if they had not been anamorphosed, they would have occupied a much higher space, as indicated in broken lines. Moreover, if one considers the angles $\alpha$ and $\beta$ (Fig. 7) under which an observer C sees images A and B respectively, their difference is considerably smaller than the difference of angles $a_1$ and $\beta_1$ under which this same observer C would see the unanamorphosed images.

Figs. 8 and 9 illustrate how the images may be anamorphosed when being recorded by means of a device of the kind indicated in Figs. 4 and 5. Two cylindrical diverging lenses $t$ and $t'$, with their axis of curvature horizontal, are disposed in front of prisms $p$ and $p'$ and between objective $m$ and the sets of prisms there is disposed a cylindrical converging lens $u$ also with its axis of curvature horizontal, in such a manner as to form a sort of double Galilean system. It will be observed that by appropriately displacing lenses $t$ and $t'$ vertically, the mean axis of the light rays may be deviated in a vertical plane, the lenses then acting as prisms. This permits of avoiding de-centering between the center of the subject MN and the objective axis XY, if desired.

Figs. 10 to 21 illustrate a modification wherein the bundles of rays of both images are deviated horizontally and vertically and they moreover show how the different optical adjustments can be performed.

In the diagram of Fig. 10, 1 designates a photographic surface such as a cinematographic film, on which the elementary images should be formed; 2 is the objective of the camera on which the stereoscopic device is disposed.

This device comprises a converging cylindrical lens 3 in the immediate vicinity of the objective 2, and a set of two double prisms 4 adapted to ensure two reflections in a vertical plane. The reflecting faces of these prisms are not quite parallel in such a manner that if one considers on film 1 the elementary images $a$ and $b$, and if it is supposed that from each emanate a bundle of light rays towards objective 2, the axes of these bundles, which are oblique with respect to the objective axis, are displaced vertically in opposed respective relation and at the same time rendered horizontal, as clearly shown in Fig. 10.

In front of prisms 4 there is disposed another set of two double prisms 5 with parallel reflecting faces. These prisms are shown in superimposed relation in Figs. 10 and 11 in such a manner that the axes of the above-mentioned bundles of rays are displaced the first one towards the right, the second one towards the left, while remaining horizontal and parallel.

For the sake of clearness, prisms 4 will be termed auxiliary prisms, prisms 5 being the main prisms, since the former may be dispensed with in some cases, as explained thereafter.

When the main prisms 5 are inclined by rotation about the longitudinal axis of the objective, as indicated in Fig. 12, the axes of the bundles of rays may be brought into one and the same horizontal plane, viz. the mean horizontal plane of the objective, instead of being situated respectively above and below the said plane.

The device also comprises two cylindrical diverging lenses 6 disposed in front of prisms 5. Lenses 6 and 3 have their axis of curvature horizontal to form a double anamorphosing system adapted to reduce the height of the images.

If one again considers the rays from images $a$ and $b$, it will be understood that they may form one and the same projected image MN if images $a$ and $b$ correspond to two different points of view of the same subject. Inversely, if MN is a subject from which light rays are radiated towards lenses 6, there are formed on surface 1 two elementary images $a$ and $b$ of the said subject, these images being reduced in height and corresponding to the subject as seen by the two lenses 6 respectively, which are spaced apart by the desired stereoscopic spacing $s$ (Fig. 12).

It is however to be remarked that the above-described device should be adjusted in accordance with the focal length of the objective 2 and with the adjustment thereof. The improved device therefore comprises adjusting gearings by means of which it may be adapted to each individual case.

Adjustment in accordance with the focal length of the objective

A cinematographic camera is generally adapted to receive a number of different objectives with different focal lengths. Since the vertical spacing of images $a$ and $b$ on the film 1 should remain constant, the inclination of the optical axis should vary in accordance with the focal length of the objective employed. This is obtained by slightly modifying the inclination of the set of main prisms 5 about the longitudinal axis (angle $a$ in Fig. 12).

And in order to correct the difference of inclination of the said axes in front of the main prisms which would result from this adjustment, lenses 6 are slightly displaced vertically in opposed direction.

For a better understanding, one may again consider the reverse direction of the light rays. Supposing that these rays emanate from images $a$ and $b$, any variation in the focal length causes a modification in the inclination of the optical axes with respect to the horizontal plane. These axes therefore enter prisms 5 higher or lower, respectively, with respect to the mean horizontal plane of the device. By modifying angle $a$ they may nevertheless be brought to emerge from these prisms at the same horizontal level, but with a different inclination with respect to a horizontal plane. By vertically displacing lenses 6, this very slight inclination may be corrected and the said axes may again converge towards the center of subject MN.

The device is preferably so constructed that with an average focal length lenses 6 have not to be displaced. Their displacement therefore remains very limited.

Adjustment in accordance with the adjustment of the objective

The objective 2 is adjusted as usual, in accordance with the distance of the subject but at the same time the double Galilean system should also be adjusted. This adjustment is preferably effected by axially displacing the converging cylindrical lens 3. In some cases the two diverging lenses 6 may also be displaced.

But the adjustment of the objective also acts on the vertical spacing of images $a$ and $b$ on film 1, since it modifies the distance between the objective center and the photographic surface. This necessitates a correction, as in the case of a variation in the focal length, but since this correction is of minor importance it is preferably effected by vertical displacement of but one lens 6.

It must be added that the said correction is a function of the focal length, being more important with objectives of longer focal lengths. This must be taken into account by the adjusting gearing of the device.

Adjustment in accordance with the last plane in the objective field

In conventional stereoscopy the rays from a point at an infinite distance should come parallel to the observer's eyes and on the other hand the eyes should be convergent for any point at a shorter distance, which implies that the rays from the elementary images of this point should diverge towards the respective eyes.

But I have found that the perception of relief is considerably improved, if the axes of the observer's eyes are no more parallel for a point at an infinite distance, but for the last plane in the objective field behind the subject. For instance in the case of a subject in front of a tapestry in the objective field, the observer's eyes will be parallel when he views a point of this tapestry.

For this purpose I arrange my improved device in such a manner that a point of this tapestry will give rise to two rays in one and the same vertical plane between the objective and the photographic surface, although the said rays are divergent when reaching the device. This is very easily obtained by a small angular displacement of the auxiliary prisms 4 about the longitudinal axis of the device. This limited rotation does not materially modify the vertical displacement of the optical axes of the two elementary images, but since the reflecting faces of the said prisms are not parallel, it causes an inclination of these axes with respect to the mean vertical longitudinal plane of the device in such a manner that the rays supposedly coming from the images would be convergent when issuing from lenses 6.

It will be noted that when the above-described adjustment is not desired, prisms 4 may be dispensed with. In such a case angle $a$ of Fig. 12 can be so selected that the optical axes (supposedly coming from the images, and not from the subject) emerge from lenses 6 at the same horizontal level. And by vertically displacing lenses 6 it is possible to correct the obliquity of these axes with respect to the mean horizontal plane of the device. But of course these vertical displacements of lenses 6 require lenses of high quality to avoid deformations.

It will also be noted that the converging cylindrical lens 3 only receives on, respectively, its upper or lower half one bundle of rays, viz. the rays respectively corresponding to the lower or upper image $b$ or $a$. The said lens may thus be cut along the mean horizontal plane of the apparatus and the two halves may be slightly inclined to be perpendicular to the respective optical axes with the objective of average focal length. This reduces optical deformations. Such a lens is illustrated in 3 in Fig. 16.

Figs. 13 to 21 illustrate a construction established in accordance with the diagrammatical representation of Figs. 10 to 12.

The apparatus illustrated comprises a casing 7 intended to be fixed in front of a usual camera. Casing 7 houses the main prisms 5 (formed by juxtaposition of four elementary prisms, as indicated in Fig. 17). This prisms unit is clamped within a support comprising two plates 8 (Fig. 16) connected by screws 9 (Fig. 17). This support is fixed to a base 10 (Fig. 15) provided with a gudgeon 11 (Figs. 14, 15 and 16) pivoted in a plate 12 forming a front closure for casing 7. Base 10 extends upwardly into a lug carrying a rounded block 13 pressed by a pusher 14 (Figs. 15 and 21) carried by a sliding rod 15 on which there is mounted a spring 16 resting against a guiding washer 17 of rod 15. Block 13 is provided with a blind hole which receives the rounded end of a screw 18 screwed through a spherical nut 19 carried by casing 7. Screw 18 is provided with an outer head 20. Actuation of head 20 thus permits of rotating support 8—9—10 about pivot 11 (adjustment of angle $a$ of Fig. 12).

A finger 21 (Fig. 14) is fixed to base 10 to form a pivot for a pointer 22 provided with a slotted tail engaged on a fixed rod 23, in such a manner that when base 10 is angularly displaced, pointer 22 is rotated in front of a dial 24 (Fig. 13). The transverse obliquity of prisms 5 can thus be readily adjusted in accordance with the focal length of the objective.

As above indicated, the cylindrical converging lens 3 is in two halves, each half being substantially perpendicular to the means direction of the optical axis of the corresponding image. Lens 3 is fixed within a support 25 (Figs. 16 and 17) slidably carried in a ring 26. Ring 26 is in turn slidable in the rear cover 27 of casing 7, wherein it may rotate while being axially retained in position. Support 25 is provided with radial fingers 28 engaged through longitudinal slots 29 of cover 27 and through helicoidal slots of ring 26 (such slots being illustrated in 30 in Figs. 19 and 20). When ring 26 is rotated by means of an actuating lever 31, support 25 is moved axially while being retained angularly. This permits adjustment of the anamorphosing system.

Support 25 is not wholly cylindrical and it has two cut portions forming two crescent-shaped spaces within ring 26. In the first one there is disposed a pair of blocks 34 (Fig. 19) with a compression spring 35 between them. In the second space there is arranged a member 36 fixed to cover 27. Blocks 34 act as wedges under the action of spring 35 and they press support 25 against member 36, whereby any lost motion in the actuation of support 25 is suppressed in spite of the play of fingers 28 through slots 29. Moreover lens 3 is perfectly maintained with its curvature axis horizontal, which avoids any twist of the images.

The diverging cylindrical lenses 6 are fixed within two supports 37 (Figs. 14, 16 and 17) vertically slidable on the front cover 12 of casing 7, such cover being therefor provided with a T-shaped central guide 12b. Each support 37 has two fingers passed through appropriate openings of cover 12. The upper finger 38 (Fig. 13) is pressed downwardly by one end of a lever 39 submitted to the downward action of a compression spring 40 which rests on the central part thereof; the lower finger 41 carries a nut 42 screwed on a vertical threaded spindle 43a or 43b. Spindle 43a extends downwardly through casing 7 and carries an outer actuating head 44. A gear wheel 45 is also fixed to spindle 43a and rests against a bridge member 46 in one with casing 7, in such a manner that rotation of head 44 causes vertical displacement of the corresponding finger 41 against the action of spring 40.

Spindle 43b also carries a gear wheel 47, equal to wheel 45 and in mesh therewith; but this gear wheel 47 does not rest against bridge member 46. The lower end of spindle 43b rests against a lever 48. The latter in turn rests on a finger 49 eccentrically carried by a plate 50 keyed on a shaft 51 (Figs. 16 and 18) provided with an outer actuating lever 52; and lever 48 also rests on the periphery of a wheel 53 (Figs. 15 and 18) carried by a screw 54 provided with an outer actuating head 55. Screw 54 is screwed in bridge member 46 and there is provided a spring 56 to suppress any lost motion.

It will be understood that actuation of head 44 permits of displacing lenses 6 in opposed directions any by the same quantity in accordance with the selected focal length, as above-explained. Actuation of lever 52 causes displacement of but one lens 6 and is used to effect correction in accordance with the adjustment of the objective. The amplitude of the vertical displacement of this lens 6 for a given angular displacement of lever 52 is dependent of the position of wheel 53 forming the fixed pivot of lever 48 and actuation of head 55 therefore permits of adapting the above correction to the focal length of the objective.

A small lever 57 (Fig. 16) is articulated to nuts 42 in such a manner as to oscillate when the latter are vertically displaced in opposed relation. Lever 57 carries a flexible blade 58 provided with a pointer 59 slidable in a vertical slot (Fig. 13) of the front cover. An appropriate scale is disposed along the said slot to enable the operator to readily adjust lenses 6 in accordance with the focal length of the objective. There is also provided a horizontal slot for another pointer 60 (Figs. 13 and 18) carried by another flexible blade 61 fixed at the end of a fork 62 pivoted at 63. Fork 62 (Fig. 18) is engaged on screw 54 and it is pressed against wheel 53 by the elasticity of blade 61 in such a manner as to oscillate when head 55 is actuated, whereby pointer 60 is moved along an appropriate scale.

Lever 52, which controls vertical displacement of one of lenses 6 to adjust the anamorphosing system in accordance with the adjustment of the objective, and lever 26a (Figs. 17 and 19) which controls adjustment of lens 3, are connected with each other and with the lever (not illustrated) controlling adjustment of the objective of the camera in such a manner that the operator may effect the three adjustments at the same time.

The auxiliary prism unit 4 is carried by a support 64 (Fig. 14) fixed to one end of a longitudinal shaft 65. The latter is disposed between prisms 5 and its front end carries an arm 66 (Fig. 13) provided with an actuating head 67 movable within a guide 68 provided with an appropriate scale. As above-explained actuation of head 67 enables the operator to determine the distance for which the stereoscopic angle will be null.

The apparatus described thus permits all the adjustments mentioned in reference to Figs. 10 and 12.

Figs. 22 and 24 illustrate an apparatus for viewing the elementary stereoscopic images projected on a screen one above the other and in the anamorphosed state. This device comprises two monocular Galilean systems with cylindrical lenses with their curvature axis horizontal. Each monocular system has a casing 74 with a cylindrical diverging lens 75 at one end and a cylindrical converging lens 76 at the other end. The two casings 74 are connected with each other by means of a spherical articulation comprising a ball 77 with a vertical rod 78 driven therethrough, the upper and lower ends of rod 78 receiving nuts 79 adapted to press against casings 74 two spherical washers 80 (Fig. 23). This connection permits of rotating casings 74 with respect to each other about a transverse axis and also about a longitudinal axis (arrows 81 and 82 of Figs. 23 and 24). The device is held in front of the observer or spectator by an articulated support not shown provided with a spherical joint 83 (Fig. 22) frictionally mounted in a bearing 84 fixed to one casing 74.

By rotating casings 74 with respect to one another about a transverse axis (arrow 81, Fig. 24) one eye can see the upper elementary image while the other one sees the lower image. Each casing is provided with a small screen 85 adapted to screen the lower image for the eye which must see the upper one and the upper image for the eye which must see the lower one. This first adjustment is sufficient for an observer disposed substantially in front of the projection screen.

But in the case of an observer C (Fig. 25) disposed laterally with respect to the projection screen, the elementary images appear to the naked eye as indicated in Fig. 26, i. e. as deformed in opposed relation. When viewed through the device adjusted as above explained (by rotation according to arrow 81 of Fig. 24), they will appear as shown in Fig. 27, i. e. they will be twisted in opposed direction by the anomorphosing systems of casings 74. Their optical superimposition will be very difficult or even impossible. But if casings 74 are rotated with respect to one another about a longitudinal axis (arrow 82 of Fig. 23) the virtual images seen by the observer will rotate in opposed direction and for a correct adjustment their perfect superimposition will become easy, as indicated in Fig. 28.

Lenses 75 and 76 are preferably slightly prismatic, as illustrated by the section of Fig. 22, whereby the axes of the bundles of rays reaching the eyes are slightly displaced, which permits of using the full width of lenses 76.

I claim:

1. The herein-described stereoscopic method using images of large dimensions, which comprises the step of anamorphosing elementary stereoscopic images in such a manner as to reduce one of their two main dimensions with respect to the other one; and the step of viewing said images juxtaposed on a support in the direction of their reduced dimension through an anamorphosing device restoring to the said images their original relative proportions.

2. The herein-described stereoscopic method which consists in photographically recording on a photographic surface a pair of elementary stereoscopic images through a first anamorphosing system reducing one of their two main dimensions with respect to the other one; in projecting the said anamorphosed images on a screen in such a manner as to juxtapose said projected images in the direction of their reduced dimension; and in viewing the said projected images through a second anamorphosing system complementary of the said first anamorphosing system so as to restore to said images their relative proportions.

3. The herein-described stereoscopic method which consists in photographically recording a pair of elementary stereoscopic images on a photographic surface through a first anamorphosing system reducing their height with respect to their width; in projecting the said anamorphosed images on a screen one above the other, and in viewing the said projected images through a second anamorphosing system complementary of the said first system so as to restore to said images their relative proportions.

4. The herein-described stereoscopic method using elementary images of large dimensions obtained by projection of small images recorded by means of a camera on a photographic surface, which comprises the step of recording from a single subject a pair of elementary stereoscopic images on said photographic surface in closely juxtaposed relation one above the other with the optical axis of the objective lens of the camera inclined in the vertical plane with respect to the subject for each of said last-named images in opposite direction with respect to the other one, said images being recorded through an anamorphosing system which reduces their height with respect to their width; in projecting the recorded images in the anamorphosed state on a projection screen, the image recorded with the corresponding objective lens axis inclined upwardly from the subject to the camera being disposed below the other image on said screen; and in viewing the said projected images through a second anamorphosing system complementary of said first anamorphosing system so as to restore to said images their relative proportions.

5. The herein-described stereoscopic method using elementary images of large dimensions obtained by enlarging small images recorded on a photographic surface by means of a camera having a single objective which comprises the step of leading to said single objective by means of reflecting devices light rays from a single subject under two substantially opposed inclinations in a vertical plane in such a manner as to form on said surface a pair of elementary stereoscopic images in closely juxtaposed relation one above the other, the optical axis of said objective being inclined in the vertical plane with respect to the subject for each of said last-named images in opposite direction with respect to the other one, the image recorded with the said optical axis inclined upwardly from the subject to the camera being disposed when enlarged below the other image.

6. In a method as claimed in claim 2, said projected images being viewed through two separate complementary anamorphosing systems each corresponding to one eye and optical differences between the virtual images produced by said complementary systems being corrected by rotating said systems in opposite directions about a substantially longitudinal axis.

7. The herein-described stereoscopic method using images of large dimensions, which comprises the step of anamorphosing elementary stereoscopic images in such a manner as to reduce one of their main dimensions with respect to the other one; the step of viewing said images juxtaposed on a support in the direction of their reduced dimension through two anamorphosing devices each forming of one of said juxtaposed images a virtual image having its relative proportions restored; and the step of causing optical superposition of said virtual images by relative rotation of said anamorphosing devices about a longitudinal axis.

8. The herein-described stereoscopic method which consists in photographically recording on a photographic surface a pair of elementary stereoscopic images through a first anamorphosing system reducing one of their two main dimensions with images on a screen in such a manner as to juxtapose said projected images in the direction of their reduced dimension; in viewing said projected images through two anamorphosing systems, each forming of one of said projected images a virtual image having its relative proportions restored; and in causing optical superposition of said virtual images by relative rotation of said last-named, anamorphosing systems about a longitudinal axis.

9. The herein-described stereoscopic method which consists in photographically recording a pair of elementary stereoscopic images on a photographic surface through a first anamorphosing system reducing their height with respect to their width; in projecting the said anamorphosed images on a screen one above the other; in viewing said projected images through two anamorphosing systems, each forming of one of said projected images a virtual image having its relative proportions restored; and in causing optical superposition of said virtual images by relative rotation of said last-named anamorphosing systems about a longitudinal axis.

PIERRE JUILLET.

REFERENCES CITED

The following references are of record in the file of this patent:

UNITED STATES PATENTS

| Number | Name | Date |
|---|---|---|
| 1,032,172 | Zollinger | July 9, 1912 |
| 1,074,284 | Neuhaus | Sept. 30, 1913 |
| 1,283,676 | Comstock et al. | Nov. 5, 1918 |
| 1,328,291 | Parker | June 20, 1920 |
| 1,520,311 | Ruth | Dec. 23, 1924 |
| 1,619,949 | Mannes et al. | Mar. 8, 1927 |
| 1,655,850 | Watts | Jan. 10, 1928 |
| 1,729,617 | Kelley et al. | Oct. 1, 1929 |
| 1,815,208 | Moraz | July 21, 1931 |
| 1,829,633 | Chretien | Oct. 27, 1931 |
| 1,864,445 | Barbier | June 21, 1932 |
| 1,971,234 | Peppercorn | Aug. 21, 1934 |
| 2,017,634 | Newcomber | Oct. 15, 1935 |
| 2,168,273 | Sauer et al. | Aug. 1, 1939 |
| 2,207,409 | Newcomer | July 9, 1940 |
| 2,223,630 | Levy | Dec. 3, 1940 |
| 2,224,775 | Barton | Dec. 10, 1940 |
| 2,240,728 | Vierling et al. | May 6, 1941 |
| 2,314,174 | Steinman | Mar. 16, 1943 |
| 2,384,259 | Quinby | Sept. 4, 1945 |
| 2,413,996 | Ramsdell | Jan. 7, 1947 |

FOREIGN PATENTS

| Number | Country | Date |
|---|---|---|
| 675,081 | France | Oct. 29, 1929 |
| 675,120 | France | Oct. 29, 1929 |
| 789,755 | France | Aug. 26, 1935 |
| 825,604 | France | Dec. 16, 1937 |
| 660,600 | Germany | May 30, 1938 |
| 910,409 | France | Jan. 28, 1946 |